United States Patent
Avidan et al.

(10) Patent No.: US 7,685,115 B2
(45) Date of Patent: Mar. 23, 2010

(54) METHOD FOR CLASSIFYING PRIVATE DATA USING SECURE CLASSIFIERS

(75) Inventors: Shmuel Avidan, Brookline, MA (US); Ariel Elbaz, New York, NY (US)

(73) Assignee: Mitsubishi Electronic Research Laboratories, Inc., Cambridge, MA (US)

( * ) Notice: Subject to any disclaimer, the term of this patent is extended or adjusted under 35 U.S.C. 154(b) by 413 days.

(21) Appl. No.: 11/490,782

(22) Filed: Jul. 21, 2006

(65) Prior Publication Data

US 2008/0021899 A1    Jan. 24, 2008

(51) Int. Cl.
G06F 17/00    (2006.01)
(52) U.S. Cl. .......................... 707/4; 707/101
(58) Field of Classification Search ............. 707/101, 707/3–7
See application file for complete search history.

(56) References Cited

U.S. PATENT DOCUMENTS

| | | | | |
|---|---|---|---|---|
| 5,337,371 | A * | 8/1994 | Sato et al. | 382/100 |
| 5,422,961 | A * | 6/1995 | Simard | 382/224 |
| 5,572,604 | A * | 11/1996 | Simard | 382/224 |
| 5,619,620 | A * | 4/1997 | Eccles | 706/20 |
| 6,857,553 | B1 * | 2/2005 | Hartman et al. | 228/103 |
| 7,305,378 | B2 * | 12/2007 | Aggarwal et al. | 707/1 |
| 2003/0065926 | A1 * | 4/2003 | Schultz et al. | 713/188 |
| 2004/0153430 | A1 * | 8/2004 | Sayad | 706/61 |
| 2005/0021488 | A1 * | 1/2005 | Agrawal et al. | 707/1 |
| 2005/0213825 | A1 * | 9/2005 | Basak et al. | 382/224 |
| 2007/0053507 | A1 * | 3/2007 | Smaragdis et al. | 380/28 |
| 2007/0058871 | A1 * | 3/2007 | Deligiannakis et al. | 382/224 |
| 2007/0239999 | A1 * | 10/2007 | Honig et al. | 713/194 |
| 2007/0271379 | A1 * | 11/2007 | Carlton et al. | 709/225 |

OTHER PUBLICATIONS

Protocols for secure remote database access with approximate matching, Wenlian Du, Mikhail J. Atallah, CERIAS Tech Report 2001-02.*

Statistical Pattern Recognition: A review, Anil K, Jain, Robert P.W. Duin, Jianchang Mao; IEEE transactions of pattern analysis and machine intelligence, vol. 22, No. 1, Jan. 2000.*

G. Aggarwal, N. Mishra, and B. Pinkas. Secure computation of the kth-ranked element. In Advances in Cryptology—Eurocrypt '2004 Proceedings, pp. 40-55, 2004.

I. F. Blake and V. Kolesnikov. Strong conditional oblivious transfer and computing on intervals. In Proc. of ASIACRPYT 2004, pp. 515-529, 2004.

W. Du and M. J. Atallah. Protocols for secure remote database access with approximate matching. In In 7$^{th}$ ACM Conference on Computer and Communications Security (ACMCCS 2000), The first Workshop on Security and Privacy in E-commerce, pp. 1-4, 2000.

(Continued)

Primary Examiner—John R. Cottingham
Assistant Examiner—Mohammed R Uddin
(74) Attorney, Agent, or Firm—Gene Vinokur; Dirk Brinkman

(57) ABSTRACT

A computer implemented method classifies securely a private query sample using exact k-nn classification. A secure dot product protocol is applied to determine securely distances between a private query sample and a plurality of private labeled samples. A secure k-rank protocol is applied to the distances to determine a nearest distance of a $k^{th}$ nearest labeled sample having a particular label. Then, a secure Parzen protocol is applied to the nearest distance to label the private query sample according to the particular label.

10 Claims, 1 Drawing Sheet

OTHER PUBLICATIONS

G. Jagannathan and R. N. Wright. Privacy-preserving distributed k-means clustering over arbitrarily partitioned data. In KDD '05: Proceedings of the eleventh ACM SIGKDD international conference on Knowledge discovery in data mining, pp. 593-599, New York, NY, USA, 2005. ACM Press.

Y. Lindell and B. Pinkas. Privacy preserving data mining. In Crypto: Proceedings of Crypto, 2000.

* cited by examiner

METHOD FOR CLASSIFYING PRIVATE DATA USING SECURE CLASSIFIERS

FIELD OF THE INVENTION

This invention relates generally to data classification, and more particularly to performing private data classification.

BACKGROUND OF THE INVENTION

In general, data classification is well known in the art. Of particular interest are binary classifiers. Such classifiers simply give a 'yes' or 'no' answer to indicate whether a particular sample belong to a particular class or not.

Private data classification enables two parties, Alice (a client) and Bob (a server), to engage in a protocol that enables Alice to classify data using Bob's classifier, without revealing anything to Bob, not even the classification result, and without learning anything about Bob's classifier, other than an answer to a classification request. Private data classification brings together the fields of machine learning and cooperative, secure multi-party computing, which is a sub-field of cryptography.

When data are collected, stored, and manipulated for various uses, privacy considerations are crucial. The area of privacy-preserving data mining addresses the need to perform specific data mining tasks, while maintaining the privacy of the data of all parties involved, so that no information is revealed, Y. Lindell and B. Pinkas, "Privacy preserving data mining," in CRYPTO: Proceedings of Crypto, 2000.

One important task is that of data classification, where a large amount of labeled data is used to classify query data samples. The most common density-based classification technique is k-nearest neighbor (k-nn) classification.

K-nn classification can be used for data mining, pattern recognition, and data compression applications. Many of the applications that require classification are highly sensitive, where one party (Alice the client) has a private query data sample to be classified, and another party (Bob the server) has private labeled data and a private classifier. Neither part wants to reveal any private information during the classification.

For example, a client would like a laboratory to classify a biological sample without the laboratory knowing the result of the classification. In addition, the laboratory does not want to reveal its classification process. In another application, a client would like to have surveillance data, e.g., images in a video, analyzed without revealing the content of the video. In addition, the party that performs the analyzing does not want to reveal its analysis tools.

It is desired to perform privacy-preserving k-nn classification, as well as a Parzen window classification, and other approximate k-nn classifications.

Classification Background

K-nn classification is a non-parametric method for estimating a density of a probability distribution function (pdf) at a particular query sample. Density estimation can be used for classification by taking a maximum posterior solution. That is, the density for each category is measured and the query sample is classified by a label corresponding to the maximum posterior solution. One variant of this method uses a Parzen window classifier. Both methods use a small neighborhood around the query sample to estimate the density of the pdf.

A size of the neighborhood can be defined by distance, as is done with the Parzen window classification, or by order, as is done with k-nn classification. It is possible to convert the order to the distance by determining the distance of the $k^{th}$ nearest neighbor and then applying the Parzen window method using this distance.

K-nn classification does not require training. However, the method is relatively slow because all the labeled samples in the classification database must be tested to determine whether any of the labeled samples are in the neighborhood of the query sample. To accelerate this process, an approximate nearest neighbors can be used instead of exact nearest neighbors. The goal of the approximate nearest neighbor methods is to accelerate the classification method at the expense of determining only approximate nearest neighbors and not exact nearest neighbors.

It is desired to perform the above classifications in a secure manner so that the private query data sample is not revealed to the party performing the classification, and the classifier is not revealed to the party having the private query data sample.

Cryptographic Background

Secure Computation

Two-party private computation is described by A. C. Yao, "Protocols for secure computations," in Proc. 23rd IEEE Symp. on Foundations of Comp. Science, pp. 160-164, 1982. Two parties, usually referred to as Alice and Bob, have private inputs (x, y), respectively. The parties want to evaluate a function $f$ using these inputs, such that at the end, Alice obtains $f(x, y)$ but has no other information on the input y. Bob should not learn anything from the evaluation. Assuming the existence of an oblivious transfer (OT) protocol, Yao gives a constructive answer to this problem. Yao describes how to transform a circuit for determining $f(x, y)$ into a protocol, such that if Alice and Bob follow the protocol, at the end of the protocol, Alice obtains $f(x, y)$ and Bob learns nothing.

The OT protocol can be extended to any functionality in such settings, O. Goldreich, S. Micali, and A. Wigderson, "How to play any mental game or a completeness theorem for s with honest majority," in ACM Symposium on Theory of Computing, pages 218-229, 1987. In principle, these constructions could provide a secure protocol for k-nn classification. However, the general constructions become impractical even for "simple" functions, and are hard to implement for most real-world applications.

In particular, when the database is huge, as is typically the case in data mining applications, the performance of the general constructions is completely prohibitive.

Efficient Private Data Mining

In an example application, multiple entities have databases of medical records. Sharing the databases can improve medical research. However, the privacy of the patients must not be compromised. In another application, competing companies may benefit from sharing market research databases. However, the companies do not wish to reveal any secret business information to their competitors.

One method provides a private protocol to determine a polynomial P(x) when Alice knows P and Bob knows x, M. Naor and B. Pinkas, "Oblivious polynomial evaluation," in Proc. of the 31st Symp. on Theory of Computer Science (STOC), pages 254-254, 1999. Their result was used for a protocol for private computation of ID3 learning trees by Y. Lindell and B. Pinkas, "Privacy preserving data mining," in CRYPTO: Proceedings of Crypto, 2000. A special case of secure polynomial evaluation is a secure dot-product, and various solutions to this problem are known, H. L. B. Goethals, S. Laur and T. Mielikainen, "On secure scalar product computation for privacy-preserving data mining," in the 7th Annual International Conference in Information Security and Cryptology, 2004, and Y. Chang and C. J. Lu, "Oblivious polynomial evaluation and oblivious neural learning," in ASIACRYPT: Advances in Cryptology, ASIACRYPT: International Conference on the Theory and Application of Cryptology, LNCS, 2001.

Another protocol for distributed k-means determines a minimum of a shared list of numbers by resorting to general Yao circuit evaluation, G. Jagannathan and R. N. Wright, "Privacy-preserving distributed k-means clustering over arbitrarily partitioned data," in KDD '05: Proceeding of the eleventh ACM SIGKDD Int. Conf. on knowledge discovery in data mining, pages 593-599, 2005.

Yang et al. consider a scenario of a data miner that surveys a large number of customers to determine classification rules for data, while protecting their privacy, Z. Yang, S. Zhong, and R. N. Wright, "Privacy-preserving classification of customer data without loss of accuracy," Proc. $5^{th}$ SIAM Int. conf. on Data Mining, Apr. 21, 2005. Yang and Wright describe a privacy-preserving protocol for determining a Bayesian network on vertically partitioned data, R. N. Wright and Z. Yang, "Privacy-preserving Bayesian network structure computation on distributed heterogeneous data." in KDD '04: Proceeding of the tenth ACM SIGKDD Int. Conf. on knowledge discovery in data mining, pages 22-25, 2004.

One private distributed k-nn classifier is described by M. Kantarcoglu and C. Clifton, "Assuring privacy when big brother is watching," in the 8th ACM SIGMOD Workshop on Research Issues in Data Mining and Knowledge Discovery (DMKD2003), 2003. However, there all parties know the query sample. That is, the query sample is not private. Furthermore, their classifier requires an untrusted, non-colluding third party. The only privacy they provide is in that Alice learns nothing about the databases of the other parties. Alice only obtains the final classification result.

SUMMARY OF THE INVENTION

The embodiments of the invention provide protocols (methods) for privacy preserving data classification. The protocols allow one party (Bob, a server) to classify another party's (Alice, a client) data, without learning anything about the client's data, while the client only obtains the final classification result of the data, and nothing else about the data held by the server.

The embodiments of the invention provide protocols for density-based classifiers including the most common k-nn classification (k-nearest neighbor) classifier, as well as a Parzen window classifier.

The methods can be used to provide more efficient approximate solutions for k-nn classification and nearest match retrieval.

The private protocols can perform a secure nearest neighbor search. This, in turn, is used for privacy-preserving Parzen window density estimation, and k-nn classification.

The protocols can also perform a secure approximate nearest neighbor search with complexity $O(\sqrt{n})$, where n is the number of samples in the database. This is in contrast to the $\Omega(n)$ complexity of exact k-nn classification.

Using the secure Parzen window classifier, one embodiment of the invention provides an application of approximate 1-nn for nearest match retrieval. Specifically, we give a protocol for a client to privately retrieve an item from a database that is nearest to a query item.

For example, the database contains biometric data, such as finger prints. In this application, given a finger-print, the client would like to retrieve the personal details of the individual with the nearest finger-print stored in the database.

The protocols are given as an honest but curious model, and are based on an oblivious transfer (OT) protocol, which in turn can be based on any enhanced trapdoor permutation, for example using number theoretic assumptions like the hardness of factoring.

A private protocol provides for secure nearest neighbor classification. In this case, Alice and Bob have respectively first and second private shares of distances between a private query sample that Alice has, and labeled samples in a database, that Bob has. The protocol determines a minimum distance between the private query sample and the samples in the database. The protocol can be applied k times to obtain the k nearest neighbors needed for classification.

This requires a modified protocol as now the goal is to determine a smallest number that is larger than some threshold. For example, determining the second nearest neighbor means determining the smallest number that is larger than the first nearest neighbor. An interesting by-product of this protocol is a novel protocol for nearest match retrieval that enables Alice to obtain the nearest neighbor, in Bobs' database, to her private query sample.

A heuristic method for reducing the complexity of this protocol from $O(n)$ to $O(\sqrt{n})$, where n is the number of samples in the database, by switching from exact nearest neighbors to approximate nearest neighbors.

DETAILED DESCRIPTION OF THE PREFERRED EMBODIMENT

Figure 1:
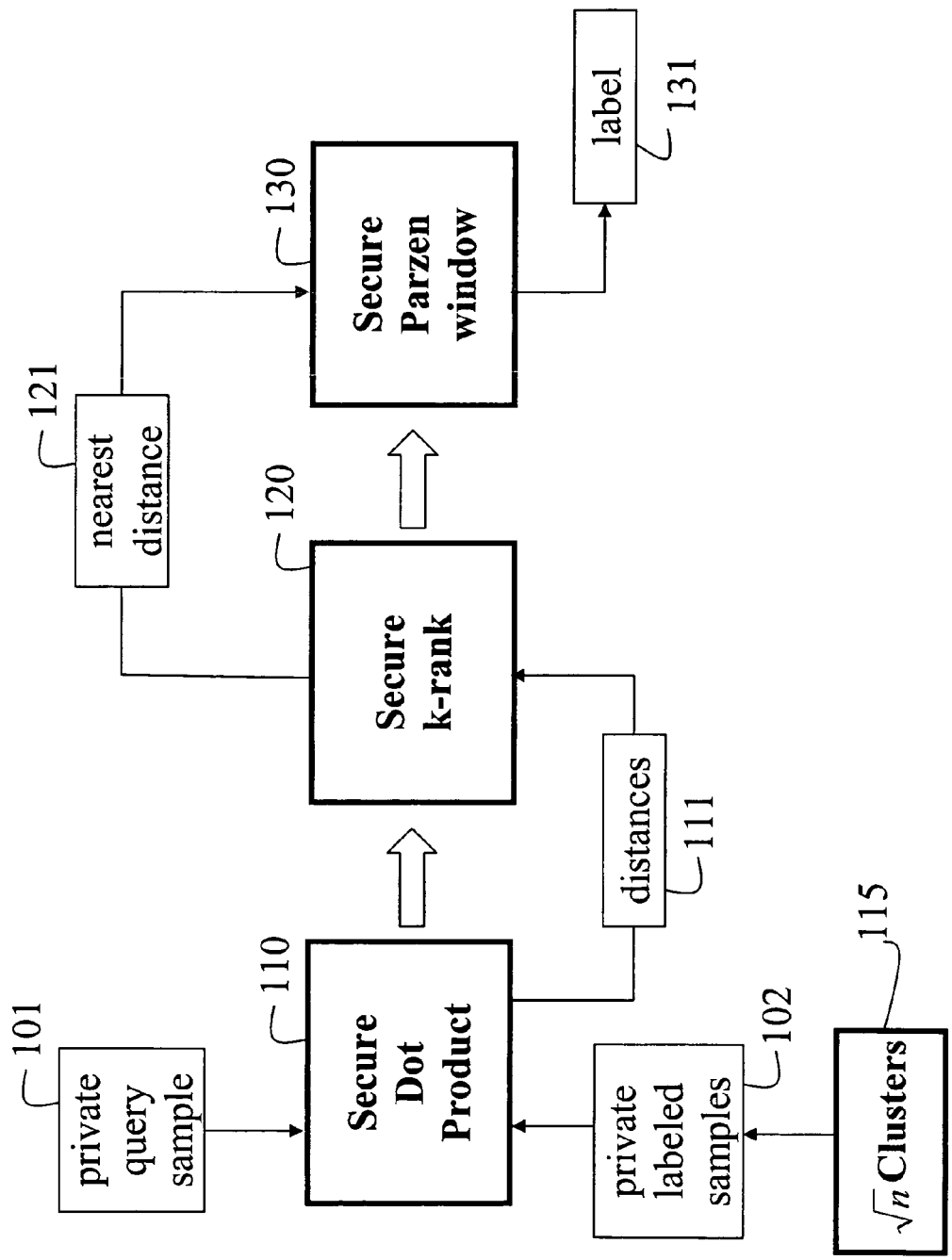
FIG. 1 is a flow diagram of a method for securely classifying samples using k-nn classification according to an embodiment of the invention.

FIG. 1 shows an embodiment of our invention for a method for privately classifying data using a k-nn classifier or a Parzen window classifier. A first party (Alice, a client) has the private 101 data x, and a second party (Bob, a server) has the classifier f and private labeled samples 102. The two parties, usually named Alice and Bob (or A and B), want to privately evaluate the function f on the data x, while each party gives the other party as little information as possible. We give exact definitions of the privacy Alice and Bob expect to obtain from their interaction.

A secure dot product is applied 110 to the private query sample 101 and the private labeled samples 102 to determine securely distances 111 between the private query sample and the plurality of private labeled samples. A secure k-rank protocol is applied 120 to the distances 111 to determine a nearest distance 121 of a $k^{th}$ nearest labeled sample having a particular label. Then, a secure Parzen window protocol is applied 130 using the nearest distance 121 to label the private query sample according to the particular label 131.

In the above method, n private query samples can partitioned 115 into $\sqrt{n}$ clusters, each cluster including $\sqrt{n}$ private labeled samples, and private shares of the distances between the private query sample and the private labeled samples in one of the clusters can be obtained before applying the protocols 110, 120 and 130.

Density Estimation

We describe density estimation methods. All computations are performed over a prime field $F=Z_p$ for some prime number p. A size of the prime field p is exponential as to the cryptographic security parameter. In all cases, we need to evaluate if an expression is larger or smaller than zero. This cannot be done over the prime field F. Therefore, the parameters are integers. We let S be some upper bound on every intermediate, absolute value in the computation that is known to both Alice and Bob. Such a value S is implicit from the choice of representation of the inputs over the integers. Then, Alice and Bob select the prime field F with cardinality bigger than 2S. Due to wrapping (modulo F), negative numbers over the integers map to numbers bigger than |F|−S, and positive numbers are smaller than S.

Private Computation

Let $f: \{0, 1\}^* \times \{0, 1\}^* \to \{0, 1\}^* \times \{0, 1\}$ be a function. We denote the first item of $f(x_1, x_2)$ by $f_A(x_1, x_2)$, and the second item by $f_B(x_1, x_2)$. Let π be a two-party protocol for evaluating the function $f$, and we denote the two parties by A for Alice, and B for Bob.

If Alice and Bob follow the protocol, then the parties are called semi-honest, or honest but curious. The views of A and B while applying the protocol $\pi(x_1, x_2)$ are, respectively $$\text{view}_A^\pi = (x_1, r_A, m_{A,1}, \ldots, m_{A,t}) \text{ and}$$

$$\text{view}_B^\pi = (x_2, r_B, m_{B,1}, \ldots, m_{B,t}),$$

where for i=A, B, we denote by $r_i$ the random input of party i, and by $m_{i,j}$ the $j^{th}$ message received by party i. The output received by party i at the end of the protocol $\pi(x_1, x_2)$ is $\text{output}_i^\pi(x_1, x_2)$.

By private computation, we mean that everything that party i learns from $\text{view}_i^\pi$ can only be determined from the input and the output. Formally, we require that $\text{view}_i^\pi$ can be simulated from the input and output of party i.

We say that the protocol π privately evaluates a deterministic function $f$ if there exist a probabilistic processes $\text{SIM}_A$ and $\text{SIM}_B$ such that, for i=A, B $$(\text{SIM}_i(x_i, f_i(x_1, x_2)) \cong \text{view}_i^\pi(x_1, x_2).$$

Oblivious Transfer Protocol

The well known oblivious transfer (OT) protocol is a cryptographic process that enables Alice to select one item from Bob's database of items. Alice obtains this item without revealing to Bob which item was selected and without learning anything about the rest of the items in the database. The most common variant of OT is $$\binom{2}{1}$$

OT, where Bob has items $(v_0, v_1)$ and Alice selects item $b \in \{0, 1\}$, and after the OT, Alice obtains item $v_b$ and nothing else, and Bob learns nothing about Alice's item.

The OT process can be constructed from any known enhanced trapdoor permutation.

The Millionaire's Problem

Alice has a number x, and Bob has a number y. Alice and Bob would like to compare the two numbers and determine who has the larger number, without revealing anything else about the numbers themselves. This is a generalization of the well known millionaire's problem where two parties desire to know who has the most money, without revealing the amount each party owns.

Protocol 1—Secure Millionaire Protocol

To compare the two numbers, Alice and Bob define two comparison values $\{\mathcal{A}, \mathcal{B}\} \in F$, which are used to compare the result, typically $\{\mathcal{A}, \mathcal{B}\} = \{0, 1\}$.

Input

Alice has a number $x \in \{0, 1\}^m$, and Bob has a number $y \in \{0, 1\}^m$.

Output

Alice obtains a, Bob obtains b, such that $$a + b = \bmod F = \begin{cases} \mathcal{A} & \text{if } x \geq y \\ \mathcal{B} & \text{if } x < y \end{cases}.$$

This is the secure millionaire's protocol.

Protocol 2—Secure Dot Product Protocol

We use a secure dot product protocol to determine a distance between two samples in the prime field $F^d$, see below. The samples can be finger prints, biological sample, images, and the like.

Alice has a vector $X \in F^d$, and Bob has a vector $Y \in F^d$, Alice and Bob privately determine shares of the dot (inner) product. The secure dot product protocol is well known.

Input

Alice has $X \in F^d$, and Bob has $Y \in F^d$.

Output

Alice obtains a, Bob obtains b, such that a+b (mod F)=$X^T Y$, where T is the conventional notation for a transpose operator.

Secure Rank Protocol

Alice and Bob can use the secure dot product protocol to determine respectively first and second private shares of a distance between the private query sample and labeled samples in the database of the classifier. Now, Alice and Bob need to determine labeled samples in a small neighborhood label the private query sample.

A size of the neighborhood can be either defined by a radius, as is done in Parzen window classification, or by order, as is done in k-nn classification. We can convert the order to the radius by determining the distance of the $k^{th}$ nearest sample, and then applying the Parzen window classification using this distance.

Alice and Bob have respectively first and second private shares of the distance $d_1$ of the nearest neighbor to the private query sample, and now wish to determine first and second private shares of the second nearest neighbor. Actually, Alice and Bob have random shares to the squared distances. This does change the ranking of the $k^{th}$ item.

The above can be expressed as determining a smallest distance, in a list of distances, subject to a constraint that this distance should greater than $d_1$. This rules out selecting the nearest neighbor again because the distance $d_1$ to the nearest neighbor is not greater than the threshold. By repeatedly updating the threshold, and applying the secure rank protocol for k−1 times, we determine the $k^{th}$ nearest neighbor. To preserve privacy, the threshold parameters are given as random shares.

We use two intermediate protocols in the secure rank protocol. The first, called the private shared-minimum protocol, is a modification of the millionaire's protocol in the case where both parties have private shares to the numbers to be compared. The output is a random share of the minimum distance. The second intermediate protocol adds a threshold parameter, and requires that the output is greater that this threshold.

Private Share Minimum Protocol

In this well known protocol, Alice and Bob have private shares of x and y, and want to obtain private shares of a minimum of x.

Formally, Alice has $x_A$, $y_A$ and Bob has $x_B$, $y_B$ such that $x_A + x_B = x$ (mod F), and $y_A + y_B = y$ (mod F). After the secure evaluation, Alice has $z_A$ and Bob has $z_B$, such that $z_a + z_b = z$ (mod F), where z=min (x, y). Because x is an item of F, after adding $x_a+x_b$ (mod F), we obtain exactly x, and not a value that is congruent to x. The same is true for y. Thus, we can compare x, y as integers, and obtain the random shares $z_a$, $z_b$ which are congruent to the minimum of (x, y), and yet are random in the prime field F.

We can construct a Boolean circuit for evaluating this function. The circuit sums $x_a+x_b$, and $y_a+y_b$, and subtracts |F| if the result is bigger than |F|. Then, we compare x, y, and output random shares of the minimum. We can use Yao's circuit for this private computation.

To extend the private share minimum protocol to more than two numbers, one can either iterate this protocol over the pairs of numbers or construct a circuit that directly compares more than two numbers.

Threshold Private Shared Minimum Protocol

The well known private threshold shared minimum protocol differs from the private shared minimum protocol by adding another input, the threshold, such that on input x, y, t, the output is the minimum of x, y that is also at least t. If x, y<t, then the output is t. The inputs are given as respective first and second private shares of Alice and Bob, and the output is given as random shares of the minimum.

We can construct a circuit for this function. The random shares are added modulo F, x, y, and are compared to t. If x, y>t, then the output is just the minimum of x, y. If x<t<y, then the output is y. If x, y<t, then the output is t.

Secure k-Rank Protocol

The well known secure k-rank protocol applies the protocol for k−1 times, updating the threshold after every iteration. Formally, Alice and Bob have respectively first private shares $a_1, \ldots, a_n$ and second $b_1, \ldots, b_n$, and a list of squared distances $d_1, \ldots, d_n$. All distances are unique positive numbers. Then, the distance of the nearest neighbor is determined by setting the threshold to zero.

Protocol 3—Secure Parzen Window Protocol

A density of a Parzen-window can be estimated by $$p(X) = \frac{1}{n}\sum_{i=1}^{n} \frac{1}{V}\rho\left(\frac{X-X_i}{2r}\right), \quad (1)$$

where the n labeled samples $X_1, \ldots, X_n$ are independently and identically distributed (i.i.d), r is a radius of a volume of $V=(2r)^d$, and $\rho(u)$ is a window function defined as $$\rho(u) = \begin{cases} 1 & |u_j| \leq 0.5; \\ 0 & \text{otherwise} \end{cases} \quad j=1,\ldots,d. \quad (2)$$

That is, the Parzen window protocol p(X) measures a density of labeled samples in a hypercube centered around the private query sample X. Classifiers based on Parzen-window estimation, estimate densities of each class and classify the private query sample by the label corresponding to a maximum posterior probability of the labeled samples.

Bob has n private labeled samples in a d-dimensional space, $\{X_i, y_i\}_{i=1}^n$, where c is a maximum number of classes, and $y_i$ are corresponding labels of the samples in the database. Alice has the private query sample X. Alice has the values c and n. Alice wants to privately label the private query sample X using the secure Parzen window protocol. Alice and Bob have respectively first and second private shares $r_A$ and $r_B$, of a Parzen window with a radius $r=r_A+r_B$.

Given $\{X_i, y_i\}_{i=1}^n$ private labeled samples in the database, we determine the label y of the majority of labeled samples that are within the radius r from the private query sample X.

The protocol for the secure Parzen window protocol proceeds as follows.

1. In an input step, Alice provides a private query sample X and a first private share $r_A$ if the radius $r=r_A+r_B$ of the Parzen window, and Bob provides a database of samples $X_1, \ldots, X_n$ with labels $y_1, \ldots, y_n \in \{1, \ldots, c\}$ and a second private share $r_B$ of the radius.
2. For i=1, ..., n, Alice and Bob perform the following steps.
   (a) determining private shares of squared distances $d_i$ between the private query sample X and the labeled samples $X_i$ using the secure dot product protocol such that a sum of the private shares $a_i+b_i$ is equal to $-2X^T X_i$, where T is the transpose operator.
   (b) Alice adds $X^2$ to $a_i$, and Bob adds $X_i^2$ to $b_i$ to obtain $a_i+b_i=d_i=\|X-X_i\|_2^2$.
3. For i=1, ..., c, Alice and Bob perform the following step
   (a) Alice sets $a_i$=0.
   (b) Bob sets $b_i$=0.
   (c) For j=1, ..., n, perform the following steps:
      i. Alice and Bob use Yao's garbled circuit for the following function:
   (d) Alice learns p, $$p = \begin{cases} \pi(0) & d_j < r \\ \pi(1) & \text{otherwise} \end{cases}$$

(e) where $\pi(.)$ denotes a random permutation and the permutation
   (f) function $\pi()$ is known to Bob.
   (g) ii. Bob generates a random number $\Delta b$.
   (h) iii. If $y_j \neq i$, then Bob constructs a two entry table in which all entries
   (i) are $\Delta a=-\Delta b$,
   (j) iv. If $y_j=i$, then the entries are $$\Delta a = \begin{cases} -\Delta b & p=\pi(0) \\ -\Delta b + 1 & p=\pi(1) \end{cases} \quad (3)$$

(k) v. Alice uses OT with p as her index to learn $\Delta a$.
   (l) vi. Alice updates $a_i=a_i+\Delta a$, and Bob updates $b_i=b_i+\Delta b$.
4. Alice and Bob apply the secure k-rank protocol with $a_1, \ldots, a_c$ and $b_1, \ldots, b_c$ as their private shares to determine: $\arg_i \max(a_i+b_i)$, which is a label of a majority of the labeled samples that are within the radius r of the private query sample X.

Bob knows only the radius r of the window, so Alice sets $r_A$=0, and Bob sets $r_B$=r. The results are private shares for Alice and Bob, and one party sends a private share to the other party to obtain the result.

In step 3, Alice and Bob apply a variant of the secure k-rank protocol that determines the maximum, not the minimum of a list of distances.

Obtaining the Private Query Sample

Bob desires to search for records in Alice's database. In this case, it is not enough to detect that a particular record exist in the database. Bob is interested in the information associate with the private query sample X. The secure Parzen window protocol only reveals the label of private query sample X, not its value or associated data record. This problem is solved as follows.

For simplicity of this description that the classification problem is a binary classification. At the beginning of the last step of the above secure Parzen window protocol, Alice has first private shares $a_1$, $b_1$, and Bob has second private shares $a_2$, $b_2$. Both parties agree that if a predicate $a_1+b_1 < a_2+b_2$ is true, then the private query sample X is a possible candidate record, and Alice should provide the record to Bob, otherwise, Bob should learn nothing. To solve this Alice and Bob apply the private share minimum protocol. At the end of the private shared minimum protocol, Bob has a random permutation p of the predicate. Note that we reverse the roles of Alice and Bob in this case. Alice can now construct a two-way OT table that Bob can index with p. One entry in the table contains the private query sample, the other entry contains an empty string.

Protocol 4—Secure k-nn Protocol

A secure k-nn protocol maximizes $$P(y_m|X) = \max_i P(y_i|X) \quad (4)$$

where $y_1, \ldots, y_c$ are the possible states. The k-nn protocol classifies the query sample X by measuring the density of each class and taking the maximum density. This is very similar to the secure Parzen window protocol, only now the size of the neighborhood is data dependent and not determined ahead of time. Therefore, we determine the distance of the $k^{th}$ nearest neighbor as a preprocessing step and then apply the secure Parzen window protocol. We determine the distance of the $k^{th}$ nearest neighbor by applying the shared minimum protocol $k-1$ times. Alice and Bob start with $t_A = t_B = 0$, and use the output of each iteration as input for the next invocation of the threshold shared minimum protocol. After $k-1$ rounds, Alice and Bob have private shares of the correct distance, and they can invoke the secure Parzen window protocol to complete the secure k-nn protocol.

Given $\{X_i, y_i\}_{i=1}^n$ labeled samples, we determine the label of the majority of labeled samples that are the k nearest neighbors of the private query sample X.

Input

Alice has the private query sample X. Bob has a database of labeled samples $X_1, \ldots, X_n$ with labels $y_1, \ldots, y_n \in \{1, \ldots, c\}$, and a parameter k.

Output

Alice obtains the label of the majority of the samples within the k nearest neighbors of the private query sample X.

1. Alice and Bob compute private shares of the squared distance from the query point to the points in the database, see also the first step in the secure Parzen window protocol.
2. Alice and Bob apply the secure k-rank protocol on the list of shared distances to obtain private shares $r_A$ and $r_B$, respectively, of the $k^{th}$ nearest neighbor.
3. Alice and Bob apply the secure Parzen protocol with $r_A$ and $r_B$.

Nearest Match Protocol

In some cases, Alice might be interested in querying a database for the labeled sample nearest to her private query sample. For example, if Alice has a finger-print, she might be interested in querying a database to obtain the nearest match to her private query sample. This can be achieved by using our k-nn protocol with k=1. With slight modification of the secure k-nn protocol Alice can obtain all the attributes of the nearest match, not just its label.

Approximate Nearest Neighbors Protocols

Nearest neighbor methods scale linearly with the number of samples in the database. As a result, approximations are often used to speed up the computations. The approximations can be used with any of the protocols described above. We first describe the non-secure approximate nearest neighbor protocol and then describe how to make the approximate protocol secure.

Non-Secure Approximate Nearest Neighbors Protocol

Bob can partition his labeled samples into $l=\sqrt{n}$ clusters, each having l samples at most. There are several ways for Bob to do this. One way is to apply a k-means process to the data and determine l centroids. Then, Bob attaches at most l samples to each centroid. Alternatively, Bob can use a k-d tree to recursively partition the space until each node in the k-d tree contains l samples or less. Then, each node is represented by the centroid of all its samples. Partitioning the space to accelerate retrieval is mainly useful in low-dimensional spaces. In case the data are in high-dimensional spaces, geometric hashing methods are more appropriate.

Secure Approximate Nearest Neighbors Protocol

The secure approximation nearest neighbor protocol includes a number of stages. First, we determine the nearest centroid to the private query sample. Then, we determine private shares of the distances of the labeled samples associated with this centroid to the private query sample. Finally, we apply the secure-APX-nn protocol.

The key observation is that Bob generates his private share ahead of time, and for each centroid Bob generates Alices's private shares. When Alice and Bob agree on the nearest centroid, Alice obtains her private shares from Bob. Then, Alice and Bob apply the secure-k-nn protocol.

Formally, Bob has n labeled samples $X_1, \ldots, X_n$. Denote $l=\sqrt{n}$, and let $C_1, \ldots, C_l$ be the centroids determined by Bob. Let $X_{ij}$ represent the $j^{th}$ sample associated with centroid i. Then, the private share of Alice for the private query sample $X_{ij}$ is given by $A_{ij} = X_{ij} - B_i$.

Protocol 5—Secure-APX-nn Protocol

Given $X_1, \ldots, X_n$ samples, we determine approximately, the k nearest neighbors of the private query sample X.

Input

Alice has the private query sample X, and Bob has a database of labeled samples $X_1, \ldots, X_n$, and a parameter k.

Output

Alice and Bob obtain private shares of approximate k nearest neighbors of the private query sample X.

1. Bob determines private shares $B_1, \ldots, B_l$.
2. For i=1, ..., l Bob performs the following steps
   (a) For j=1, ..., l Bob does the following
      Bob determines $A_{ij} = X_{ij} - B_i$.
3. Bob generates l attributes $T(C_1), \ldots, T(C_l)$, where $T(C_i) = \{A_{ij}\}_{j=1}^l$
4. Alice and Bob apply the secure k-nn protocol with k=1 to determine the nearest centroid $C_i$ to the private query sample X. Instead of obtaining private shares of the nearest centroid, Alice and Bob obtain private shares of $T(C_i)$.
5. Alice and Bob now have private shares of the l approximately nearest sample to the private query sample X and can now apply any of the protocols described above.

EFFECT OF THE INVENTION

The embodiments of the invention provide methods for privacy preserving k-nn classification. The methods enable one party to have its data classified by another party, securely. This is done by developing a secure nearest neighbor search protocol that is then used for several secure density estimation methods, including Parzen window classification as well as exact and approximate k-nn classification.

It is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for classifying securely a private query sample using exact k-nn classification, wherein nn means nearest neighbor, and k is a number of the nearest neighbors, comprising:
using an apparatus to perform the method comprising the steps of:
applying a secure dot product protocol to the private query sample and a plurality of private labeled samples to determine securely distances between the private query sample and the plurality of private labeled samples;
applying a secure k-rank protocol to the distances to determine a nearest distance of a $k^{th}$ nearest labeled sample having a particular label; and
applying a secure Parzen window protocol using the nearest distance to label the private query sample according to the particular label to label the private query sample according to the particular label to classify the private query sample, and wherein all of the applying steps are performed in part on a client computer and in part on server computer to provide secure multi-party computing for the classifying.

2. The method of claim 1, in which the private query samples are fingerprints.

3. The method of claim 1, in which the private query samples are biological samples.

4. The method of claim 1, in which the private query samples are surveillance images.

5. The method of claim 1, in which the private query samples are biometric data.

6. The method of claim 1, in which there are a plurality of n private query samples, and further comprising:
partitioning the plurality of n private labeled samples into $\sqrt{n}$ clusters, each cluster including $\sqrt{n}$ private labeled samples;
obtaining private shares of the distances between the private query sample and the private labeled samples in one of the clusters; and
performed the applying steps of claim 1.

7. The method of claim 1, in which the secure k-rank protocol applies a secure rank protocol k−1 times.

8. The method of claim 1, in which the secure Parzen window protocol measures a density of the private labeled samples in a hypercube centered around the private query sample.

9. The method of claim 1, further comprising:
obtaining securely a record associated with the private query sample.

10. A computer implemented method for classifying securely a private query sample, comprising:
using an apparatus to perform the method comprising the steps of:
(1) providing a private query sample X and a first private share $r_A$ of a radius $r=r_A+r_B$ of a Parzen window by a first party Alice, and providing a plurality of n labeled samples $X_1, \ldots, X_n$, with labels $y_1, \ldots, y_n \in \{1, \ldots, c\}$ for a maximum of c classes, and a second private share $r_B$ of the radius of the Parzen window by a second party Bob;
(2) performing for i=1, . . . , n the steps of:
(a) determining private shares of squared distances $d_i$ between the private query sample X and the labeled samples $X_i$ using a secure dot product protocol such that $a_i+b_i=d_i'=-2X^T X_i$; and
(b) adding $X^2$ to $a_i$ by Alice and adding $X^2_i$ to $b_i$ by Bob to obtain $a_i+b_i=d_i=\|X-X_i\|_2^2$;
(3) performing for i=1, . . . , c the steps of:
(a) setting $a_i=0$ by Alice; and
(b) setting $b_i=0$ by Bob; and
(c) performing for j=1, . . . , n the steps of:
(i) applying a millionaire's protocol to obtain p for Alice, in which p is a random permutation of a first comparison value of the millionaire's protocol if $d_j<r$, and otherwise p is a random permutation of a second comparison value υ, and to obtain the random permutation by Bob;
(ii) generating a random number $\Delta b$ by Bob;
(iii) constructing a two entry table by Bob having entries $\Delta a=-\Delta b$ if $y_i \neq I$, and otherwise if y=I the entries are $$\Delta a = \begin{cases} -\Delta b & p = (A) \\ -\Delta b + 1 & p = (U); \end{cases}$$

(iv) indexing, by Alice, the two entry table with the random permutation p to obtain $\Delta a$ uses an oblivious transfer protocol; and
(v) updating by Alice the first private share $a_i=a_i+\Delta a$, and updating by Bob the second private share $b_i=b_i+\Delta b$; and
(4) performing by Alice and Bob a secure k-rank protocol with the first private shares $a_1, \ldots, a_c$ and the second private shares $b_1, \ldots, b_c$ to determine $\arg_i \max(a_i+b_i)$, which is a label of a majority of the labeled samples that are within the radius r of the private query sample X, and wherein Alice is a client computer and Bob is a server computer to provide multi-party computing for the classifying.

* * * * *